(12) United States Patent
Porat

(10) Patent No.: US 7,118,678 B2
(45) Date of Patent: Oct. 10, 2006

(54) PORTABLE OZONE TREATMENT FOR SWIMMING POOLS

(75) Inventor: Joseph Porat, North Caldwell, NJ (US)

(73) Assignee: Aqua Products, Inc., Cedar Grove, NJ (US)

( * ) Notice: Subject to any disclaimer, the term of this patent is extended or adjusted under 35 U.S.C. 154(b) by 61 days.

(21) Appl. No.: 10/384,472

(22) Filed: Mar. 7, 2003

(65) Prior Publication Data

US 2004/0173542 A1    Sep. 9, 2004

(51) Int. Cl.
*C02F 1/78* (2006.01)

(52) U.S. Cl. .................. 210/748; 210/760; 210/169; 210/192; 210/198.1; 210/244

(58) Field of Classification Search .............. 210/748, 210/760, 169, 192, 198.1, 242.1, 244; 261/DIG. 42
See application file for complete search history.

(56) References Cited

U.S. PATENT DOCUMENTS

| | | | | |
|---|---|---|---|---|
| 4,019,986 A | * | 4/1977 | Burris et al. | 210/139 |
| 4,640,783 A | * | 2/1987 | Kern | 210/760 |
| 4,966,717 A | | 10/1990 | Kern | |
| 4,995,123 A | * | 2/1991 | Kern | 4/490 |
| 5,059,296 A | | 10/1991 | Sherman | |
| 5,094,822 A | * | 3/1992 | Dunder | 422/186.22 |
| 5,106,495 A | * | 4/1992 | Hughes | 210/139 |
| 5,336,399 A | * | 8/1994 | Kajisono | 210/169 |
| 5,900,143 A | * | 5/1999 | Dalton et al. | 210/192 |
| 6,508,929 B1 | | 1/2003 | Mercer | |
| 6,511,638 B1 | * | 1/2003 | Matsuzaki | 422/186.18 |
| 2002/0139756 A1 | * | 10/2002 | Matsuzaki | 210/748 |
| 2003/0141181 A1 | * | 7/2003 | Matsuzaki | 204/164 |

FOREIGN PATENT DOCUMENTS

| | | |
|---|---|---|
| EP | 1022411 | 7/2000 |
| EP | 1041220 | 10/2000 |
| JP | 05305289 | 11/1993 |
| WO | 9749882 | 12/1997 |

* cited by examiner

Primary Examiner—Betsey Morrison Hoey
(74) Attorney, Agent, or Firm—Abelman, Frayne & Schwab

(57) ABSTRACT

A portable battery-powered ozone generator, or ozonator, contained in a waterproof housing with an air intake and an ozone discharge conduit diffuses ozone directly into a body of water in a pool, pond or tank. The ozone generator and housing can be part of (1) a buoyant floating platform that is also equipped with solar power collector panels to provide a recharging current for the battery; (2) a robotic, self-propelled pool cleaner; or (3) a skimmer filter assembly that can include a solar panel under a solar transmissive cover that is flush mounted in the walk area alongside the pool.

43 Claims, 6 Drawing Sheets

PORTABLE OZONE TREATMENT FOR SWIMMING POOLS

FIELD OF THE INVENTION

This invention relates to the addition of ozone to water contained in swimming pools or in tanks for general biocidal purposes and/or for demineralizing hard water.

BACKGROUND OF THE INVENTION

Ozone generators or ozonators have been utilized in connection with fixed or permanent swimming pool water purification systems, as well as in various commercial and industrial water treatment processes. The ozone is typically introduced as a pressurized gas into a pipeline through which the water is circulated, or through a fixed injector or other diffusing pipe passing through a side wall of the pool or tank.

Ozone, or $O_3$, is a highly-reactive oxidizing agent formed of three loosely bound oxygen atoms, one of which readily dissociates to oxidize organic matter and/or to form oxides of inorganic dissolved minerals. The ozone can be generated at the site of use by a corona discharge generator. The desirable effect achieved by introducing dissolved ozone molecules into swimming pool water is to kill or render harmless bacteria, algae and fungi and, in the case of hard water, to form insoluble mineral oxides which can then be removed in the pool's mechanical filtration system.

A further advantage of ozone treatment of swimming pool water is the ability to reduce the amount or concentration of chlorine and/or bromine in the water. Chlorine and bromine at any concentration produces unpleasant odors for bathers and can cause severe eye irritation, dry skin and other unpleasant effects. Moreover, it has been found that some bio-organisms are able to mutate and become resistant to chlorine at customary concentrations. Special action must be taken to "shock" treat the water to kill these organisms. By contrast, ozone acts as a biocide upon contact at any concentration.

Another desirable attribute of ozone is that its reaction by-product is pure oxygen. Water treated with ozone can at first appear cloudy; however, once the organic and/or mineral by-products are removed by the filter system. The water has a sparkling and clear appearance as well as a pleasant, fresh smell and taste. The ozone can be produced by electrical corona discharge from atmospheric oxygen. No special chemicals are required and no chlorine is released into the environment.

The principal disadvantage to ozone addition processes and apparatus of the prior art is their relatively high cost. The ozone generator must be incorporated into the water pumping and filtration system that circulates the water in the pool. Installation requires a substantial capital investment and skilled labor. Retrofitting an existing system will be even more expensive than incorporating an ozone generator at the initial stage of construction.

It is therefore an object of the present invention to provide an ozone treatment system and method for swimming pools and tanks that is relatively inexpensive compared to those of the prior art.

It is another object of the invention to provide an ozone generator for swimming pools that is portable and also reliable and simple to operate and requires relatively little maintenance.

SUMMARY OF THE INVENTION

The above objects and further advantages are achieved by a portable ozone treatment system for diffusing ozone directly into a volume of water contained in a swimming pool or a tank that comprises a housing that is placed in the water, an electrical ozone generator mounted in the housing and connected to an electrical power source, an ozone discharge outlet extending from the ozone generator and in fluid communication with the water, whereby ozone produced in the generator is discharged for diffusion into the surrounding water.

In one preferred embodiment, the housing is buoyant and floats on the surface of the water during operation. In this embodiment, a 12 or 24 volt DC battery serves as the power source. A solar energy collector panel, or panels, are fitted to the upper surface of the floating housing to provide a recharging current to the battery.

Since the ozone generator requires a continuous source of oxygen, the floating housing includes an air inlet. In order to guard against the entry of water into the floating housing, a check valve or snorkel is fitted in fluid communication with the air intake. In a particularly preferred embodiment, the battery and ozone generator are secured in a waterproof sub-assembly or compartment located in the floating housing. A separate air intake check valve is provided on the internal compartment to further guard against any water that may find its way into the housing.

In order to avoid damage to the components, a water sensing shut-off switch can also be incorporated into the circuitry in the event that water is admitted into the interior of the housing. An audible and/or visual alarm signal can also be provided to alert the user of the presence of water inside the housing so that appropriate remedial action can be taken.

In a particularly preferred embodiment, the floating housing can include a pool entertainment center such as that described in co-pending patent application Ser. No. 10/292,793. The floating entertainment center includes one or more rechargeable batteries and solar energy collector panels to provide a recharging current.

In order to assure maximum efficiency, the output of the ozone generator is passed to a diffusion tip where it is discharged in the form of micro-bubbles. As used herein, micro-bubbles means bubbles having a volume and surface area that will facilitate the dissolution of the ozone into the surrounding water before the bubble reaches the surface of the water into which the bubble is discharged. The construction and placement of the diffusion tip relative to the surface of the water in order to assure maximum dissolution of ozone is well within the ordinary skill in the art. Suitable materials for manufacture of the diffusion tip include microporous ceramic and polymeric materials.

In a further preferred embodiment of the invention, the ozone generating system is incorporated into a submersible robotic pool cleaner housing, and the ozone is discharged as the pool cleaner traverses the surfaces being cleaned. The movement of the pool cleaner facilitates the distribution of the dissolved ozone throughout the water in the pool. Since the pool cleaner typically operates on the bottom surface of the pool for a majority of its travel time, the rising bubbles of ozone will have a greater contact time before the surface is reached, thereby providing an advantage to both dissolution and distribution.

In the embodiment where the housing to which the ozone generator is mounted is submerged, an air intake tube to the surface can be provided. The open end of the air intake tube can be provided with a float and a sealing valve to prohibit the incursion of water. One or more water traps can also be provided inside the submerged housing to receive and separate any water that does enter and drain down the tube.

As an alternative, a source of compressed air can be incorporated into the housing to supply the ozone generator. A compressor and reservoir storage tank can be employed in either a floating housing or in a submerged pool cleaner. The compressed air source will require a pressure regulator so that the appropriate amount of air is delivered to the ozone generator.

In a further preferred embodiment, the primary or supplemental electrical energy required by the ozone generator is provided through an electrical cable attached to a remote power supply capable of providing 12 volts to 24 volts DC current. A remote power supply can be used with either of the floating or submersible pool cleaner embodiments of the invention. The remote power supply can be used to supplement the solar energy collector panels, as when insufficient sunlight is available, nighttime operation cannot be supported by the available battery power or the battery ceases to function to rated capacity. A conventional waterproof electrical connector is fitted into a wall of the housing to permit attachment of the power cable.

In yet another embodiment, a floating housing generally as described above containing the ozone generator and submerged diffusion tip is tethered to a self-propelled robotic pool cleaner so that the discharged ozone is disseminated over a wider area as the floating housing tracks the movement of the submerged pool cleaner. In this embodiment, a battery or battery pack located in the floating housing with the ozone generator can also power the submerged pool cleaner via a power cable from an appropriate waterproof plug. In this use, the electrical cable serves as the tether.

In yet a further alternative embodiment, the battery is mounted in the housing of the submerged pool cleaner and the power cable delivers electricity to the ozonator. In order to provide for greater distribution of the ozone and assure that the micro-bubbles will be absorbed in the water, the ozonator can also be located in the housing of the moving cleaner. An air compressor, snorkel tube and storage vessel will be required to supply surface air to the corona discharge device.

In a further specialized embodiment of the invention, the solar power collector panel is incorporated into the surface of an access cover for a pool skimmer filter assembly. The underside of the skimmer plate is provided with a shallow waterproof housing containing the ozonator, rechargeable battery with any necessary circuitry, and an ozone conduit. The discharge end of the ozone conduit is positioned below the surface of the water. An air intake port extends through either the upper surface of the cover plate adjacent the solar collector panel or through a wall of the housing. Since the skimmer access plate is located on the horizontal surface adjacent the pool, the solar panel must be provided with a protective cover sufficient to accommodate the weight of individuals walking or standing alongside the pool. The solar panel protective cover is preferably selected from polymeric materials having high transparency for the solar radiation powering the collector panels.

In yet another embodiment, the solar panels can be mounted at poolside in a favorable position to maximize energy collection. Available systems for manually or automatically repositioning the solar panels to maximize incidence of the sun's rays can also be utilized. The solar panels can be connected to the battery housing input connector via suitable cabling that is well-known in the art. A conventional power supply, or transformer, can also be used to provide power to recharge the batteries and/or operate the ozonator from a remote location proximate the pool.

Suitable ozone generators and more detailed information concerning the use of ozone, its concentration and effect on reducing chlorine and/or bromine concentrations is available from commercial sources, including Del Ozone of San Luis Obispo, Calif. at www.delozone.com; www.apphedozone.com; and $O_3$ Water Systems, Inc. of Monroe, Wash. at www.o3water.com.

Water-resistant rechargeable 12-volt and 24-volt batteries are commercially available from numerous sources. Individual batteries or battery packs can be utilized in accordance with the size and power requirements of the ozonator and the device in which the batteries are placed.

Various other embodiments and variations modification to the arrangement of the elements and method of operation of the invention will be apparent to one of ordinary skill in the art from the above general description, as well as from the drawings which form part of this application and the detailed description that is provided below.

BRIEF DESCRIPTION OF THE DRAWINGS

The invention will be described in more detail below and with reference to the attached drawings in which.

DETAILED DESCRIPTION OF THE PREFERRED EMBODIMENTS

Figure 1:
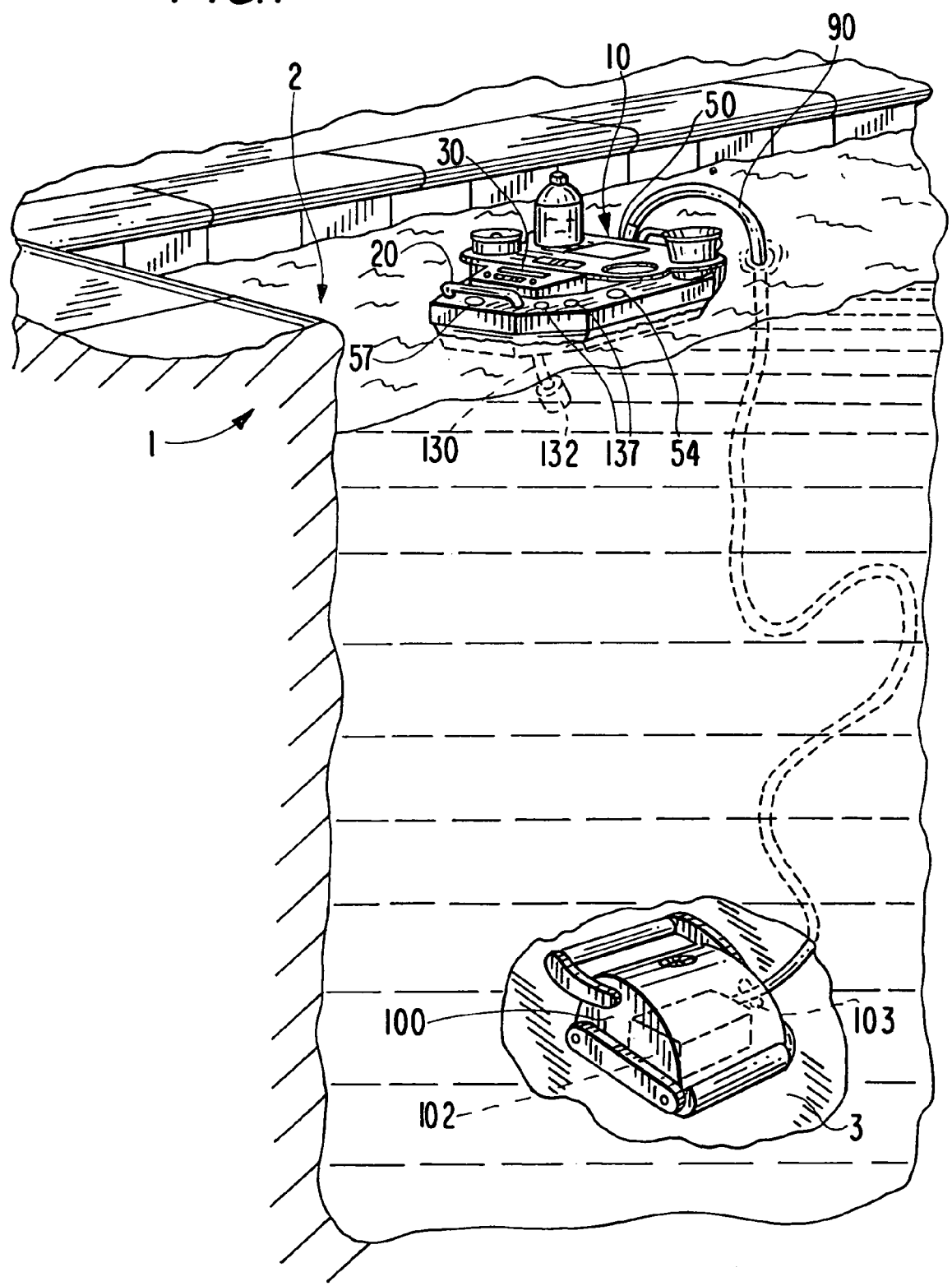
FIG. 1 is a perspective view of a portion of a swimming pool, partly in section, on which has been positioned one embodiment of the invention.

Referring now to FIG. 1, there is shown a schematic illustration of a portion of a swimming pool 1 with one preferred embodiment of the ozone generating apparatus of the invention incorporated into an electronic platform 10 floating on the surface 2 of the pool. As will be described in more detail below, the electric power for platform 10 is supplied by a rechargeable 12 or 24 volt battery or battery pack located in a waterproof housing or chamber as described in more detail in FIG. 2. Alternatively, power for the ozone generator can be delivered through a connecting power cable 90 that is attached to robotic pool cleaner 100 that is moving along at the bottom surface 3 of the pool. The robotic cleaner 100 can be powered by the rechargeable battery 72 located in the platform 10, or by a separate rechargeable battery 102 connected to a power input/output connector 103 on its exterior surface that is adapted to receive a mating connector on the end of cable 90.

Figure 2:
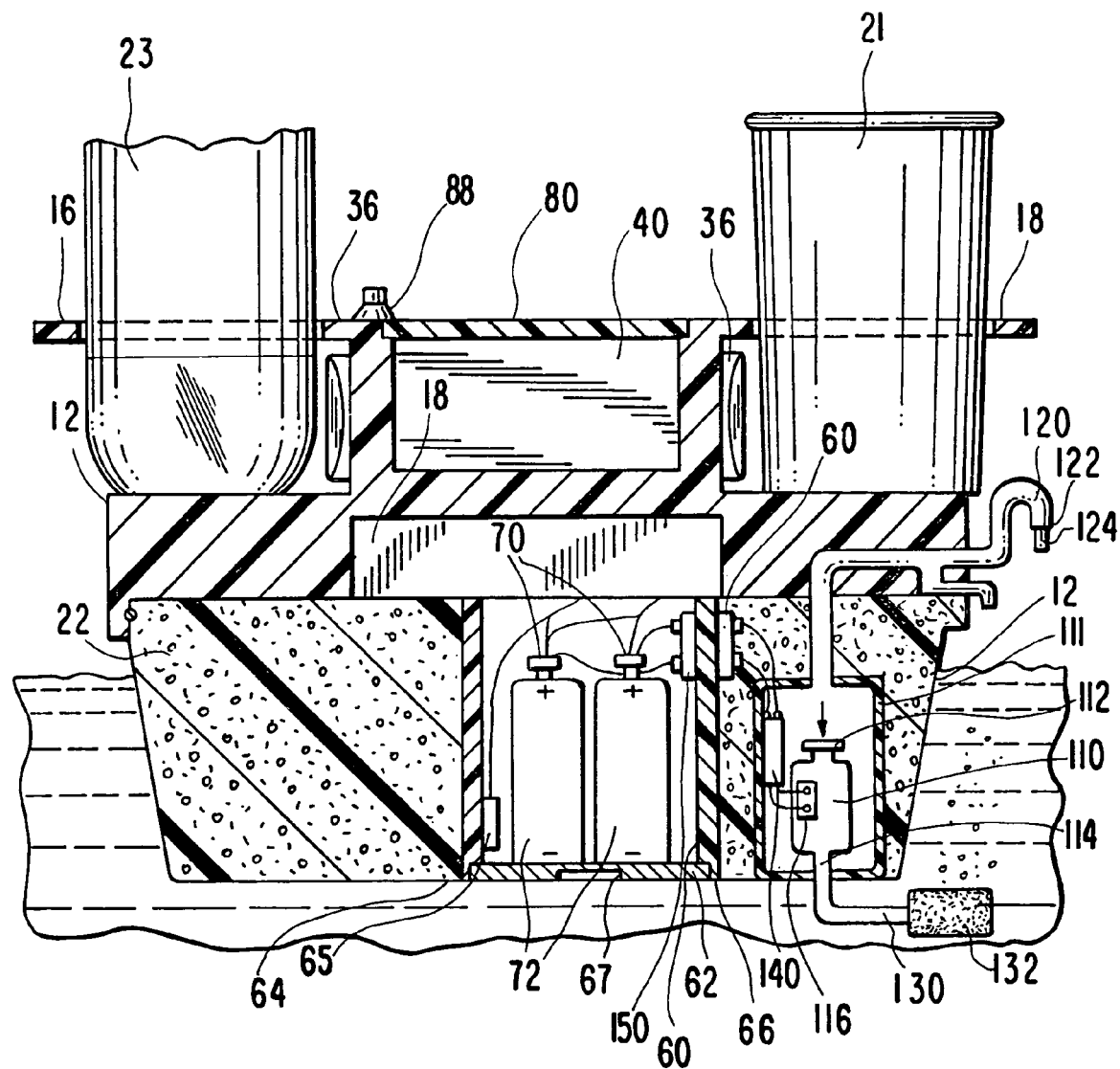
FIG. 2 is a side elevation view, partly in section, showing the embodiment of FIG. 1.
Figure 3:
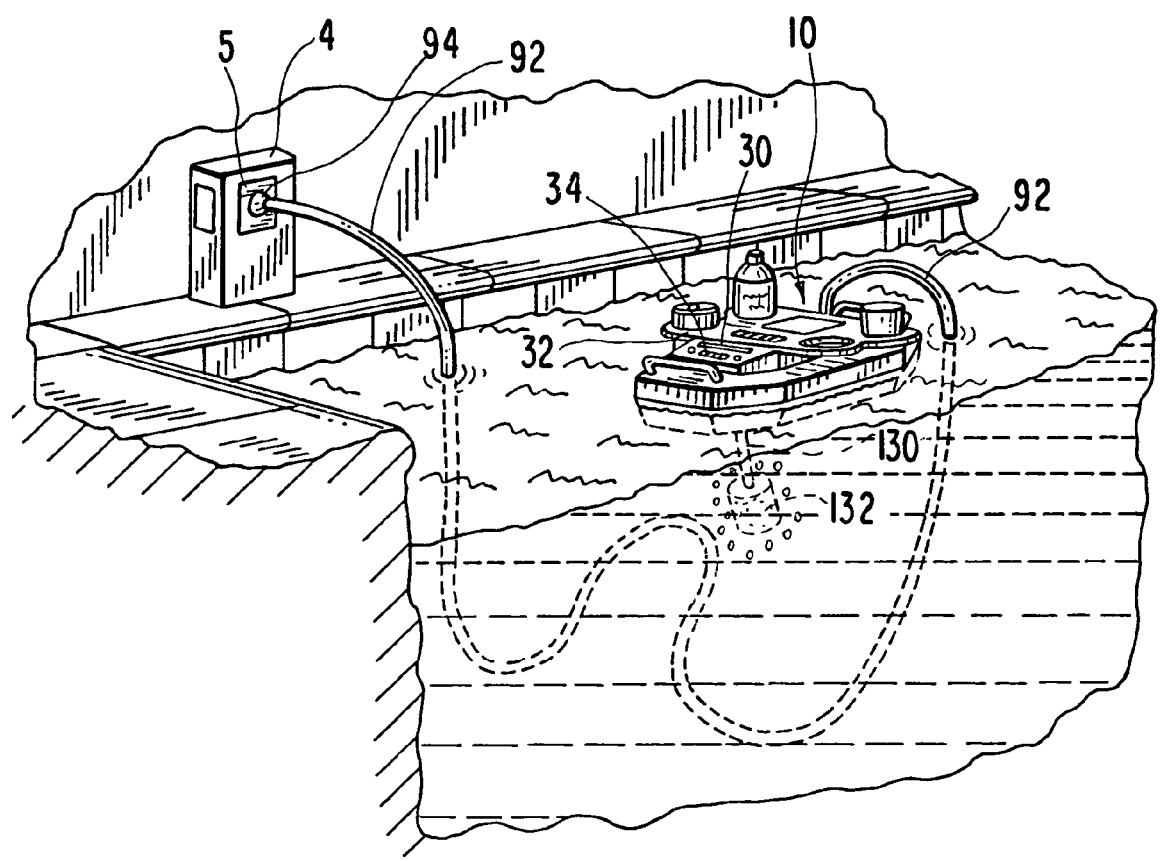
FIG. 3 is a perspective view of another embodiment of the invention.

In the embodiments illustrated in FIGS. 1–3, the floating electronic platform is set up for use as an in-pool entertainment center and is also equipped with one or more electrically-powered audio devices. In the embodiment schematically illustrated in FIG. 3, the power to floating platform 10 is provided by a cable 92 having a plug 94 that connects to a mating socket 5 in a conventional remote low-voltage power supply unit 4 located adjacent the pool. The power cable 92 is preferably of positive buoyancy and can float on the surface of the pool in order to minimize the vertical weight component on floating platform 10. However, as shown in FIG. 2, a cable having negative buoyancy can be accommodated by providing appropriate flotation 22 in the interior of the body 12 of platform 10.

For a more detailed description of the particular embodiment illustrated, reference will be made to FIG. 2. An outer housing or shell 12, which in the configuration shown has a generally planar upper surface and a rectilinear lower portion, can be fabricated from molded plastic as a unitary construction or assembled from components.

Secured to the body 12 is a retaining platform, generally referred to as 16 that is provided with a plurality of recesses or openings 18 to receive any of a variety of beverage containers 23, such as cans, bottles and cups 21.

The opposing ends of the particular portable platform illustrated includes a pair of handles 20 to facilitate the movement, placement, and the removal and carrying of the platform in and outside of the pool. As will be understood by one of ordinary skill in the art, the housing or base 12 can also be provided with integrally molded handles, either in the form of projecting grips or recessed openings. A floating lanyard or tow rope (not shown) can also be affixed to the platform to facilitate its movement and retrieval from outside of the pool using any of the long-handled tools customarily utilized for pool maintenance.

With continuing reference to FIGS. 1 and 3, it will be seen that this embodiment is provided with an audio unit 30 in the form of a radio having water-protected control elements 32 and display 34. Waterproof speaker housings can be connected both to the radio 30 and a CD player 40 located in a waterproof housing and covered by access panel 80. The platform can also be provided with one or more lights 37 that provide decorative and/or ambient illumination. The lights are preferably controlled by a photoelectric cell (not shown) to turn the lights on after dark and off in daylight.

With further reference to FIG. 2, the battery compartment 60 is located in the lower portion of base 12 and surrounded by flotation material 22. This particular positioning permits the batteries 72 to function as ballast to stabilize the platform 10. Waterproof battery storage compartment 60 is accessed by closure 62, which in the embodiment shown is joined to the housing 12 by hinges 64 and secured by one or more latches 66. The handle 67 permits the closure to be lifted to access the batteries for maintenance and/or replacement. Electrical conductors 70 are joined to conventional circuitry for powering the audio components 30 and 40, and other electrical components, such as the lights 37.

In a preferred embodiment, the platform is also provided with a safety shut-off switch 65 that can be activated by the incursion of water in the battery compartment 60 and/or by a mercury position switch and reset controller that responds to a capsize or a predetermined lesser displacement from horizontal.

With continuing reference to FIG. 2, the floating platform 10 is provided with a waterproof housing 111 in which is installed the ozone generator 110 having an air intake 112 and ozone discharge port 114 to which is connected an ozone conduit terminating in the diffuser 132. It will be understood that the conduit passes through a watertight seal in the wall of housing 12. Atmospheric air is introduced into housing 111 by air intake tube 120 which passes through openings in housing 111 through the sidewall of housing 12 of the platform 10. In the particular embodiment illustrated, air intake conduit 120 is provided with a checkvalve or snorkel device 122 at its open end, which in this case, takes the form of a buoyant ball 124 received by a mating seat that will provide a waterproof seal in the event that the platform 10 is tipped over or otherwise immersed to the level of the air intake tube 120.

As also shown in FIG. 2, the air intake tube 120 can also be fitted with a water trap and discharge that can be used in addition to, or in place of the checkvalve or snorkel at the exterior end of the air intake tube. Other alternative forms of water traps, including overflow baffles known to the art can be utilized alone or in combination with each other and/or a snorkel.

The ozonator 110 is also provided with an appropriate electrical connector 116 for receiving wiring or cabling from an optional adaptor 140 that is connected to a rechargeable battery or battery pack 72. In the embodiment shown, the battery pack is located in a separate housing for ease of maintenance. However, it will be understood by one of ordinary skill in the art that the ozonator and rechargeable batteries, along with any current adaptor circuit device required to interface with solar panels installed on the platform can all be incorporated into a single watertight housing 111. Such housing will require appropriately sealed openings to receive conduits for air intake and ozone discharge through its walls.

Water-sensitive electrical shut-off switches can also be incorporated in housings 111 and 60 to avoid damage to the ozonator circuitry and battery. An audible and/or visual alarm device can also be provided to alert the user of the incursion of water into the ozonator housing and/or battery compartment. Such devices are well known in the art.

Again referring to FIG. 1, one or more connector outlets 50, 52 and 54 are provided on a conveniently accessible surface of housing 12. In this preferred embodiment, a plurality of connectors are provided to give maximum flexibility to the powering and use of the floating platform as a source of power to one or more other battery-powered devices. For example, one type of power cable 90 will be required when the floating entertainment unit is tethered to a battery-powered pool cleaner and a different cable may be used when the unit is to be powered from a poolside power supply or other low-voltage power source as shown in FIG. 3. Alternate connector configurations can be accommodated in the plurality of input/output connectors 50, 52 and 54.

Figure 4:
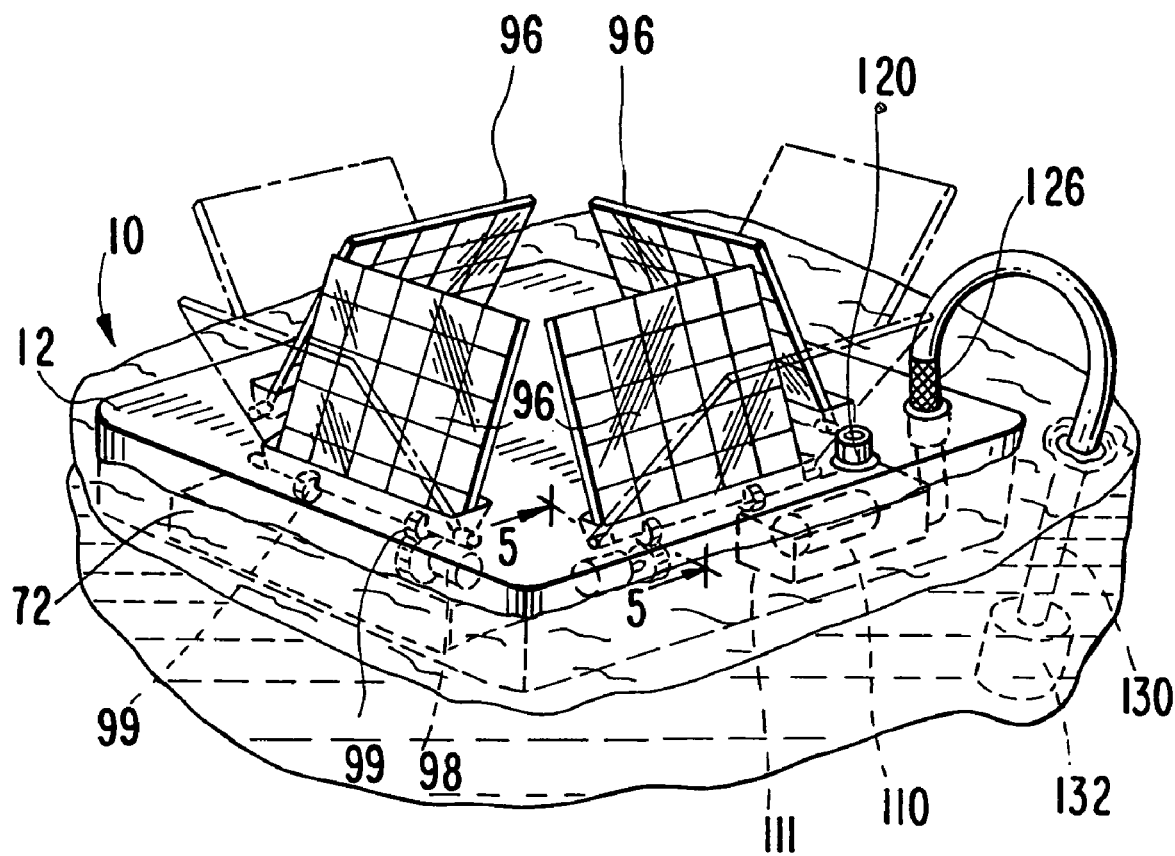
FIG. 4 is a perspective view of yet another embodiment of the invention in a floating housing.

In a further preferred embodiment that will be described generally and with reference to FIGS. 4 and 5, the floating platform can also be provided with one or more solar power collecting panels 96. These panels can be mounted on any convenient surface which will be exposed to sunlight when the floating electronic platform is in the pool. For example, as shown in FIG. 4, a plurality of solar collector panels 96 are mounted in the surface of housing 12 where they are exposed to the maximum degree of sunlight. Alternatively, the cover 80 of compartment 40, best shown in FIG. 2, can incorporate the solar panels. Appropriate wiring (not shown) extends from beneath the solar panels 96 through conventional circuitry in a current adapter to provide a charging current to rechargeable batteries 72.

Figure 5:
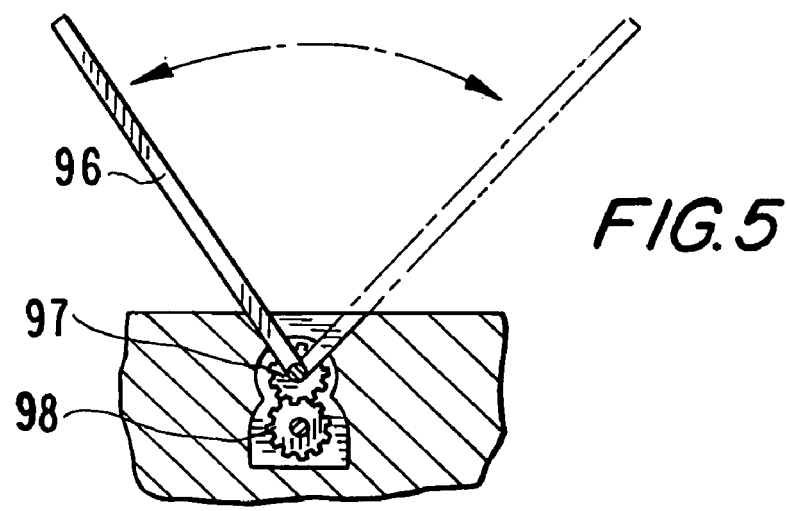
FIG. 5 is a partial sectional view taken along line 5—5 of FIG. 4.

In yet another preferred embodiment of the invention illustrated in FIGS. 4 and 5, the floating housing 10 serves only to support on body 12 one or more solar energy collector panels 96 that provide a recharging current to an on-board battery pack 72 or to a remote battery 102 such as that contained in submerged pool cleaner 100 as illustrated in FIG. 1. In this embodiment, the floating electronic platform provides a source of recharging current during the entire time that the solar collector panels are exposed to sunlight.

In the embodiment of FIG. 4, the ozonator 120 receives air from intake 124 mounted in a sealed aperture in the surface of housing 12 and discharges the ozone through outlet 126, also mounted in the surface of housing 12. The flexible tube 130 delivers the ozone to diffuser 132 for discharge and dissolution below the surface of the water.

In accordance with methods that are well established in the art, the panels 96 can be pivotally and adjustably mounted in order to receive the maximum amount of solar energy during various seasons. By mounting a plurality of independent adjustable solar panels on the floating platform as shown in FIG. 4 and adjusting their position for the optimum seasonal solar rays, the maximum energy will be produced regardless of the orientation of the floating platform as it may be moved by wind or other influences on the surface of the pool. This method of gathering solar energy to provide a recharging current for batteries will provide a particular advantage during the long daylight hours of summer and in those latitudes where the intensity and duration of the sunlight is greatest and the use of the pool and its accessories is essentially year-round.

Various mechanical and electro-mechanical means for adjustably positioning the solar panels are known to the prior art. As best shown in FIG. 5, panels 96 are attached to rotatable supports 99 and moved by gears 97 driven by servo motors 98. Alternatively, manually adjustable supports relying on frictional attachment can be utilized.

The floating electronic platform can serve to support only one or a plurality of solar power collector panels and the ozonator assembly. The recharging current can be transmitted via power cables to a remote rechargeable battery, with return leads to the ozonator. The on-board circuitry can be limited to providing terminals extending from the solar panels to the underside of a power cable connector, e.g., connector 50 and to the ozonator 120 from the battery. This will provide an efficient and low-cost apparatus for recharging the batteries of a self-propelled robotic pool cleaner, which cleaner is provided with the necessary adapter circuitry to accept the current from the solar collectors 90.

In a further preferred embodiment, the necessary circuitry is incorporated into a modular unit that has connectors adapted to mate with conventional power cables known to the art. In yet a further preferred embodiment, a robotic pool cleaner is provided with the necessary on-board circuitry to permit recharging via the current collected by the solar panels and transmitted through cable 90, as shown in FIG. 1.

Further reference is made to FIG. 1 for the illustration of floating electronic platform 10 tethered to a pool cleaner 100. In yet another preferred embodiment, the robotic pool cleaner 100 has no battery and receives its motive power from rechargeable batteries 72 located in the floating platform 10 via power cable 90. The power cable 90 can have a neutral or a positive buoyancy and the continuous tethering of the floating platform containing one or more solar panels does not impede the patterned movement of the self-propelled robotic pool cleaner during its submerged operations. Since the robotic cleaner has no battery, it is relatively lighter in weight than comparable cleaners that are provided with on-board rechargeable batteries, and therefore more easily transported for storage and maintenance outside the pool.

A yet another embodiment that can be utilized with either of the embodiments illustrated in FIGS. 1 and 3, the waterproof housing 111 containing the ozonator is attached to the housing 103 of a submersible pool cleaner 100. In this embodiment, the ozone will be more quickly distributed as the cleaner transverses the surfaces being cleaned. A source of compressed air must be provided to the intake of the ozonator in order to overcome the hydrostatic pressure at the predetermined maximum depth of the pool or tank being treated. Compressed air can be dispensed from a tank or reservoir through a regular valve that is responsive to the pressure, or directly from an air compressor that draws atmospheric air through an intake at the surface and delivers the required pressurized stream to the submerged ozonator, or a combination of both a compressor that fills the tank which then discharges a regulated air stream.

Figure 6:
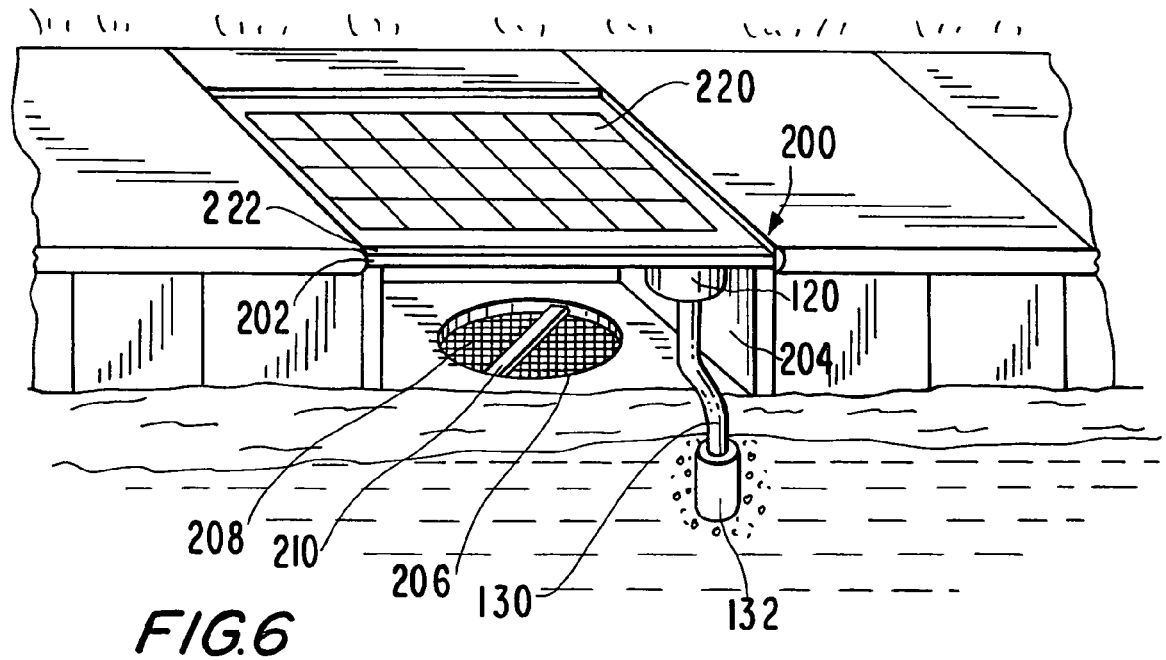
FIG. 6 is a side elevation view of a portion of the wall of a pool in which is mounted a skimmer filter assembly, shown partly in section, incorporating another embodiment of the invention.

In a further embodiment shown in FIG. 6, a swimming pool skimmer filter assembly 200 is shown mounted in the sidewall of the pool in accordance with conventional installation methods. The skimmer includes a removable cover 202 that closes the top of inlet box 204, the latter having an inlet drain 206 into which is fitted a removable filter member 208 that is provided with lifting handle 210. In order to remove the filter 208, cover 220 is lifted out of the way to permit manual access to handle 210.

In accordance with the invention, the skimmer cover 202 is provided with one or more solar panel arrays 220 over which is fitted a solar transmitting protective cover 222. The cover assembly must be strong enough to withstand the weight of individuals who may walk or even stand on the cover. Appropriate integral reinforcing can be provided in molding the cover 202 to receive the solar panel arrays in recesses with reinforcing ribs to support the protective cover 222.

Figure 7:
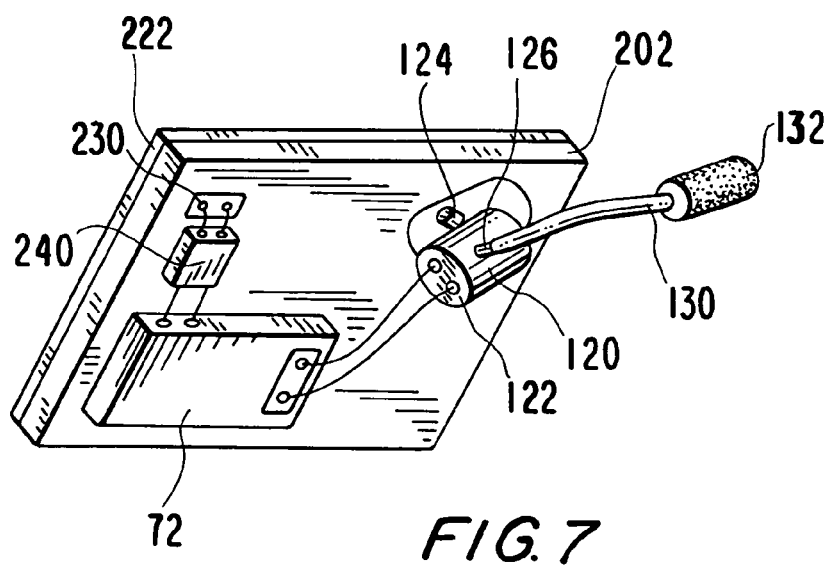
FIG. 7 is bottom left side perspective view of the access cover of the skimmer assembly of FIG. 6.

The electrical leads from the solar panels are joined to connector that passes through a waterproof fitting to the underside of the cover 202. As best shown in FIG. 7, the solar panel leads are received by connector 230 which in turn is connected to appropriate circuitry in current adaptor device 240 for transmission to one or more rechargeable batteries 72 that are retained in a waterproof housing on the underside of cover 202. The ozone generator 120 is also contained in a waterproof housing affixed to the underside of cover 202.

As in previous embodiments, the ozonator 120 is provided with electrical connector 122, and air intake port 124 and an ozone discharge port 126. As illustrated in FIGS. 6 and 7, a conduit 130 of sufficient length to submerge the diffuser 132 is attached to ozonator discharge 126. As will be understood from the description of previous embodiments, the battery 72 and associated adapter circuitry 240 and the ozonator 120 can all be incorporated into a single removable waterproof housing (not shown) that can be attached by fasteners and a gasket to the underside of cover 202. The upper surface of the cover can also be fitted with an auxiliary power connector 230 for receiving a cable from a remote power supply. Such an assembly, which includes on its exposed surface the solar panel array, can be manufactured and sold as a replacement cover assembly for use with existing skimmer installations. Since larger pools typically have two or more skimmer filter installations, the capability of increasing the volume of ozone added to the pool exists.

Figure 8:
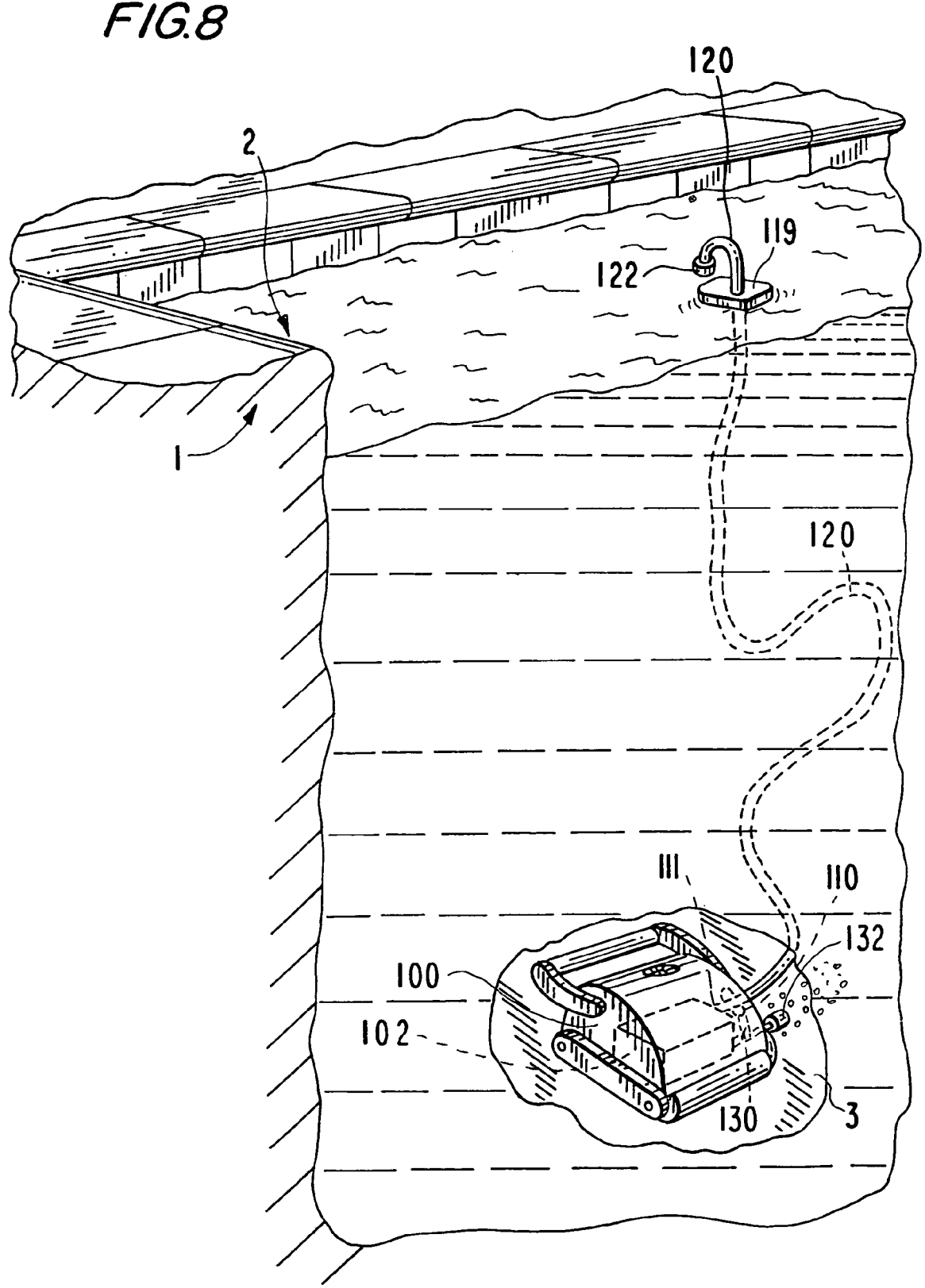
FIG. 8 is a view similar to FIG. 1, in which is positioned another preferred embodiment of the invention.

Referring now to FIG. 8, there is illustrated an embodiment in which the ozone generator 110 is mounted onboard the submerged pool cleaner 100, along with rechargeable battery or battery pack 102. The ozone conduit 130 passes through a wall of waterproof housing 111 containing the ozonator and then through a wall of the pool cleaner housing, terminating in diffuser 132. The battery 102 and ozonator 110 can be contained in a single waterproof housing or mounted in separate housings.

The atmospheric air intake conduit 120 can be fabricated from a buoyant 120 material and its intake with snorkel fitting 122 supported by a stabilizing buoyant platform 119. In a preferred embodiment of the arrangement of FIG. 8, a compressor (not shown) is mounted onboard the pool cleaner to draw and compress atmospheric air for supplying the corona discharge ozone generator 110.

From the description of the previous embodiments, it will be understood that a platform 10 of the type disclosed in FIG. 4 supporting solar collector panels 96 can be utilized in conjunction with the pool cleaner of FIG. 8. The compressor can also be placed on platform 10 for connection to air intake conduit 120. The power cable and air intake conduit can be joined into a harness.

As will be understood from the above descriptions of the several preferred embodiments, various modifications and additions can be incorporated into a floating electronic platform that will be within the skill of the art. The scope of the invention is therefore to be determined with reference to the claims which follow.

I claim:

1. A portable apparatus for diffusing ozone directly into a volume of water contained in a pool or tank, the apparatus comprising:
   a. a portable waterproof housing;
   b. an electrical ozone generator mounted in said housing;
   c. an atmospheric air intake conduit passing through a wall of the housing and in fluid communication with the ozone generator, said air intake conduit including a water guard for preventing entry of water to said ozone generator;
   d. an electrical power source connection to said ozone generator;
   e. an ozone conduit in fluid communication with the ozone generator and
   having a discharge outlet in fluid communication with the volume of water, whereby ozone produced in said ozone generator is discharged from the outlet for diffusion into the volume of water.

2. The apparatus of claim 1, wherein the discharge outlet further comprises a diffusion tip, whereby said ozone is discharged in the form of micro-bubbles.

3. The apparatus of claim 2, wherein the diffusion tip is a microporous material.

4. The apparatus of claim 2, wherein the diffusion tip is displaced below the surface of the volume of water a distance that is sufficient so that substantially all of the ozone in the form of bubbles discharged from the generator is absorbed into the water.

5. The apparatus of claim 1, wherein said housing is buoyant and floats on the surface of the volume of water during operation.

6. The apparatus of claim 5, wherein the power source comprises a rechargeable battery.

7. The apparatus of claim 6, wherein the battery is contained in a water-tight compartment in the housing.

8. The apparatus of claim 6 further comprising a solar power collector mounted on the floating housing above the waterline and electrically connected to said battery, whereby a recharging current is supplied to the battery.

9. The apparatus of claim 8 further comprising a voltage adapting circuit between said solar collector and said battery.

10. The apparatus of claim 5, wherein said housing includes a water barrier air intake.

11. The apparatus of claim 1 further comprising an intake air compressor in fluid communication with an air storage vessel mounted in said housing.

12. The apparatus of claim 11 further comprising an elongated flexible air intake tube in fluid communication with the air compressor.

13. The apparatus of claim 11, wherein the water guard on the air intake conduit includes a buoyant check valve, whereby said check valve closes when submerged to thereby exclude water from said air intake tube.

14. The apparatus of claim 1, wherein said housing is submersible and forms a portion of a self-propelled pool or tank cleaner.

15. The apparatus of claim 14, wherein the power source is an electrical power supply located remote from the volume of water and connected to the ozone generator by a cable containing electrical conductors.

16. The apparatus of claim 1, wherein the ozone discharge outlet passes through an opening in a wall of the housing below the waterline.

17. The apparatus of claim 1 further comprising a submersible self-propelled robotic pool or tank cleaner and a power cable extending from a battery in the housing to drive means associated with said cleaner, whereby the floating housing moves in response to movement of the submerged cleaner.

18. The apparatus of claim 1, wherein the output of the power source is from 12 volts to 24 volts DC.

19. The apparatus of claim 18 further comprising a power converter intermediate a battery and said ozone generator, whereby the voltage supplied to said generator is stepped up.

20. The apparatus of claim 1, wherein the waterproof housing comprises an access cover of a pool skimmer filter assembly.

21. The apparatus of claim 20, wherein the power source comprises a solar power collector.

22. The apparatus of claim 21 further comprising a protective layer of impact-resistant polymeric material disposed above the solar power collector.

23. The apparatus of claim 20, wherein the discharge outlet of the ozone conduit extends into the body of water outside of the skimmer assembly.

24. The apparatus of claim 1, wherein said water guard for preventing entry of water is selected from the group consisting of a check valve, a snorkel, a float and sealing valve, a water trap, and an overflow baffle.

25. A swimming pool skimmer filter assembly for mounting in a side well of a swimming pool comprising a body formed with a water intake opening for receiving a removable filter and a cover, said cover comprising:
   a) a waterproof housing having an upper surface and a lower surface;
   b) said upper surface fitted with at least one solar power collector panel;
   c) said lower surface containing an electrical ozone generator and a rechargeable battery in electrical connection with power output leads of said at least one solar panel;
   d) an air intake conduit extending through the waterproof housing;
   e) an ozone conduit in fluid communication with the ozone generator and having a discharge outlet for positioning below the surface of water in the pool.

26. The filter assembly of claim 25, wherein the cover further comprises an electrical connector mounted on the upper surface of the cover in electrical connection with the rechargeable battery, whereby a supplemental charging current can be supplied to the battery from a remote power source.

27. The filter assembly of claim 25, further comprising a diffuser mounted on the discharge end of the ozone conduit.

28. A method of providing dissolved ozone in a body of water contained in a swimming pool comprising:
   a. providing an electrically-powered manually portable ozonator in a waterproof housing;
   b. placing the ozonator and housing in the body of water in the pool;
   c. supplying air and electrical power to the ozonator, thereby generating a pressurized stream of ozone;
   d. directing the pressurized stream of ozone into a fluid conduit having an outlet portion in the body of water; and
   e. discharging the ozone into the water through the outlet, whereby the ozone is dissolved in the water.

29. The method of claim 28 which further includes placing the ozonator in a waterproof buoyant housing and placing the housing on the surface of the pool.

30. The method of claim 29, wherein the electrical power is supplied by a rechargeable battery.

31. The method of claim 30, wherein the rechargeable battery is electrically connected to power output leads of a solar energy collector panel.

32. The method of claim 31 which further includes placing the battery in the buoyant housing and mounting the solar power collector to a portion of the housing above the surface of the water.

33. The method of claim 28 which further includes securing the waterproof housing containing the ozonator to a portion of a submersible robotic pool cleaner.

34. The method of claim 33, wherein the electrical power supplied to the ozonator is provided by a rechargeable battery.

35. The method of claim 34, wherein the battery is onboard the pool cleaner.

36. The method of claim 33, wherein the air is supplied by providing a conduit extending from the ozonator to a source of atmospheric air above the body of water.

37. The method of claim 36 which further includes drawing atmospheric air into a compressor to pressurize the air and supplying the pressurized air to the ozonator.

38. The method of claim 37 which further includes admitting the compressed air into a reservoir tank before supplying the pressurized air to the ozonator.

39. The method of claim 28, wherein the ozone is discharge in the form of micro-bubbles.

40. A portable, battery-powered, submersible self-propelled robotic pool cleaner comprising:
   a) a housing;
   b) a rechargeable battery electrically connected to an ozonator secured to said housing;
   c) an air intake conduit in fluid communication with the ozonator;
   d) an ozone conduit in fluid communication with the ozonator and having a discharge outlet for releasing a pressurized stream of ozone.

41. The pool cleaner of claim 40 which further comprises a source of compressed air in fluid communication with the air intake conduit.

42. The pool cleaner of claim 40 which further includes a solar power collector panel electrically connected to the rechargeable battery.

43. The pool cleaner of claim 40 which further comprises a waterproof housing for the ozonator and the battery.

* * * * *